United States Patent [19]

Russell

[11] 4,007,340
[45] Feb. 8, 1977

[54] DISTANCE-RELATED VARIABLE GAIN AMPLIFIER

[75] Inventor: Taft B. Russell, Edison, N.J.

[73] Assignee: Edison Control Corporation, Metuchen, N.J.

[22] Filed: Feb. 25, 1975

[21] Appl. No.: 552,788

[52] U.S. Cl. .......................... 179/170 R; 179/16 F; 330/86

[51] Int. Cl.² .......................................... H04B 3/36

[58] Field of Search ................ 330/85, 86; 179/1 F, 179/16 F, 170 R, 170 T

[56] References Cited

UNITED STATES PATENTS

| | | | |
|---|---|---|---|
| 3,578,914 | 5/1971 | Simonelli | 179/16 F |
| 3,689,704 | 9/1972 | Wadding | 179/16 F |
| 3,731,012 | 5/1973 | Shaffer | 179/175.3 |
| 3,781,481 | 12/1973 | Shaffer et al. | 179/170 R |
| 3,903,378 | 9/1975 | Lee et al. | 179/16 F |

Primary Examiner—Kathleen H. Claffy
Assistant Examiner—Randall P. Myers
Attorney, Agent, or Firm—Lewis H. Eslinger

[57] ABSTRACT

Apparatus for electrically communicating between a given location and a variably spaced apart remote location, the locations being connected via electrical conductors. A variable gain amplifier is connected in series between the spaced apart locations for variably amplifying the signals communicated therebetween. A gain control signal that is a function of the separation between the locations is generated and applied to the variable gain amplifier to vary the gain of the amplifier in accordance with the distance between the locations. The gain control signal is proportional to the effective resistance of the electrical conductors extending between the locations. The gain of the amplifier is varied by varying the transconductance of a transconductance amplifier connected in the amplifier feedback circuit in accordance with the gain control signal.

2 Claims, 3 Drawing Figures

DISTANCE-RELATED VARIABLE GAIN AMPLIFIER

BACKGROUND OF THE INVENTION

This invention relates to automatic gain control apparatus and, in particular, to an automatic gain control system wherein signal gain is a function of the distance between communicating stations.

It is desirable, in many applications, to communicate electrical information signals between remote locations over a communication channel having minimal equipment thereon. Such applications include instrumentation telemetry wherein data is transmitted from remote sensing stations to a central control station and control information may, additionally, be returned to various controlling locations. Other applications include pipe line communication links, remote telemetry links and other instrumentation and supervisory/control links.

Each of the aforementioned communication links may be characterized as having no or minimal signal amplification devices included in the communication channel. This lack of equipment in the communication channel is preferred to minimize the cost of constructing and maintaining such channels. This is especially so for those applications wherein the communication channels are used primarily for communication between maintenance personnel or equipment wherein a high quality information link is not of paramount importance.

In systems wherein the distance between communicating stations is variable and, for the most part, unpredictable, signal attenuation presents an acute problem. In particular, audio signals are subject to substantial attenuation whereby the intelligence information conveyed thereby is severely distorted. Such signal attenuation is primarily attributed to the total resistive impedance included in the signal channel between the communicating stations. Since the basic communication channel consists of a loop formed by, for example, two electrical conductors, the total resistive impedance is equal to the inherent loop resistance of the conductors.

This problem of signal attenuation can be obviated by using a plurality of signal amplifiers in the communication channel to successively amplify the communicated signal so as to maintain a desirable signal gain. However, this technique significantly adds to the cost of constructing and maintaining the signal channel which was initially intended to be of minimal cost. Also, by providing such amplifying devices, such as repeater stations, at preselected locations along the communication channel, the desired flexibility in using that channel is unduly constrained. That is, for applications wherein signaling is to be attained between a given location, such as a central station, and a remote location, it is preferable to permit the remote location to be disposed at any arbitrary position along the conductors. However, by providing amplification devices at preselected locations along the conductors, the position of the remote signaling station must be fixed to assure a matching of the system transmission characteristics. It can be appreciated that if the remote station must be fixed to predetermined locations, the use of the communication channel in maintenance operations, for example, is not readily facilitated. Furthermore, suitable power supplies must be provided for these amplification devices, thus adding to the cost and complexity of the signal channel.

Alternatively, the problem of signal attenuation might be attended to by the use of a fixed gain amplifier at one of the communicating stations. However, since the resistive impedance between the stations is a function of the distance, the fixed gain amplifier might be inadequate to suitably amplify the signals that emanate from a distant location whereas signals transmitted from a nearby location might be "over-amplified" and distorted. If attenuator pads are disposed at the remote locations to account for the different impedances, the fixed gain amplifier would have to operate at maximum gain in all instances, with the result that the signal-to-noise ratio would be relatively poor. It is believed that if the fixed gain amplifier is replaced by an amplifier having a manually adjustable gain, less than perfect results would be attained by an operator who must adjust the amplification factor to compensate for variable distances.

Until recently, it had been very difficult to control the gain of a semiconductor amplifier to permit the proper amplification of signals transmitted over widely variable distances via electrical conductors due to the wide input dynamic range required. Primarily, it had been most difficult to change the gain of such an amplifier by changing either the voltage or current parameters thereof. However, with the advent of the transconductance amplifier, a device has now been provided that exhibits a very linear change of transconductance proportional to an input current. The operational characteristics of such transconductance amplifiers are exploited by the present invention to thereby provide a variable gain amplifier having a gain determined by the distance between communicating locations and having a large input signal dynamic range capability.

OBJECTS OF THE INVENTION

Therefore, it is an object of the present invention to provide amplifying apparatus for suitably amplifying electrical information signals that are communicated between a given location and a variably spaced apart remote location.

It is another object of the present invention to provide a variable gain amplifier for use in amplifying signals transmitted between variably spaced apart locations wherein the gain of the amplifier is a function of the distance between the locations.

Yet another object of this invention is to provide variable gain amplifying apparatus having a gain that is determined by the total resistive impedance existing between spaced apart communicating stations such that the signals transmitted therebetween are amplified to suitable values, notwithstanding the length of the communication channel that must be traversed.

An additional object of this invention is to provide a variable gain amplifier for amplifying signals in accordance with the effective resistance of a signal conductor over which the signals are transmitted.

Another object of this invention is to provide improved communicating apparatus for amplifying signals transmitted over electrical conductors of variable length wherein the conductors are not operatively connected to intermediate amplifying devices.

Various other objects and advantages of the present invention will become clear from the forthcoming detailed description thereof and the novel features will be particularly pointed out in the appended claims.

SUMMARY OF THE INVENTION

In accordance with the present invention, apparatus is provided for communicating electrical information signals between a given location and a variably spaced apart remote location, the locations being interconnected by electrical conductors which are not operatively connected to intermediate amplifying devices. A variable gain amplifier is connected in series between the given location and the remote location for variably amplifying the electrical information signals that are communicated therebetween. A gain control signal that is a function of the distance between the given and remote locations is generated and applied to the variable gain amplifier, whereby the gain of the amplifier is varied in accordance with the distance separating the communicating locations. In a preferred embodiment, the gain control signal is a function of the total resistive impedance extending between the given and remote locations. Preferably, such gain control signal is generated by supplying a constant current to the electrical conductors whereby a voltage is derived that is proportional to the product of the constant current and the resistive impedance.

The variable gain amplifier includes a feedback circuit having a transconductance amplifier therein, the transconductance amplifier exhibiting a variable gain that is a function of a control signal applied thereto. In this manner, the gain of the amplifier is controlled by the gain of the transconductance amplifier, the latter, in turn, being determined by a control signal that is proportional to the resistive impedance between the communicating locations.

BRIEF DESCRIPTION OF THE DRAWINGS

The invention will best be understood from the following detailed description taken in conjunction with the accompanying drawings in which.

DETAILED DESCRIPTION OF A CERTAIN PREFERRED EMBODIMENT

Figure 1:
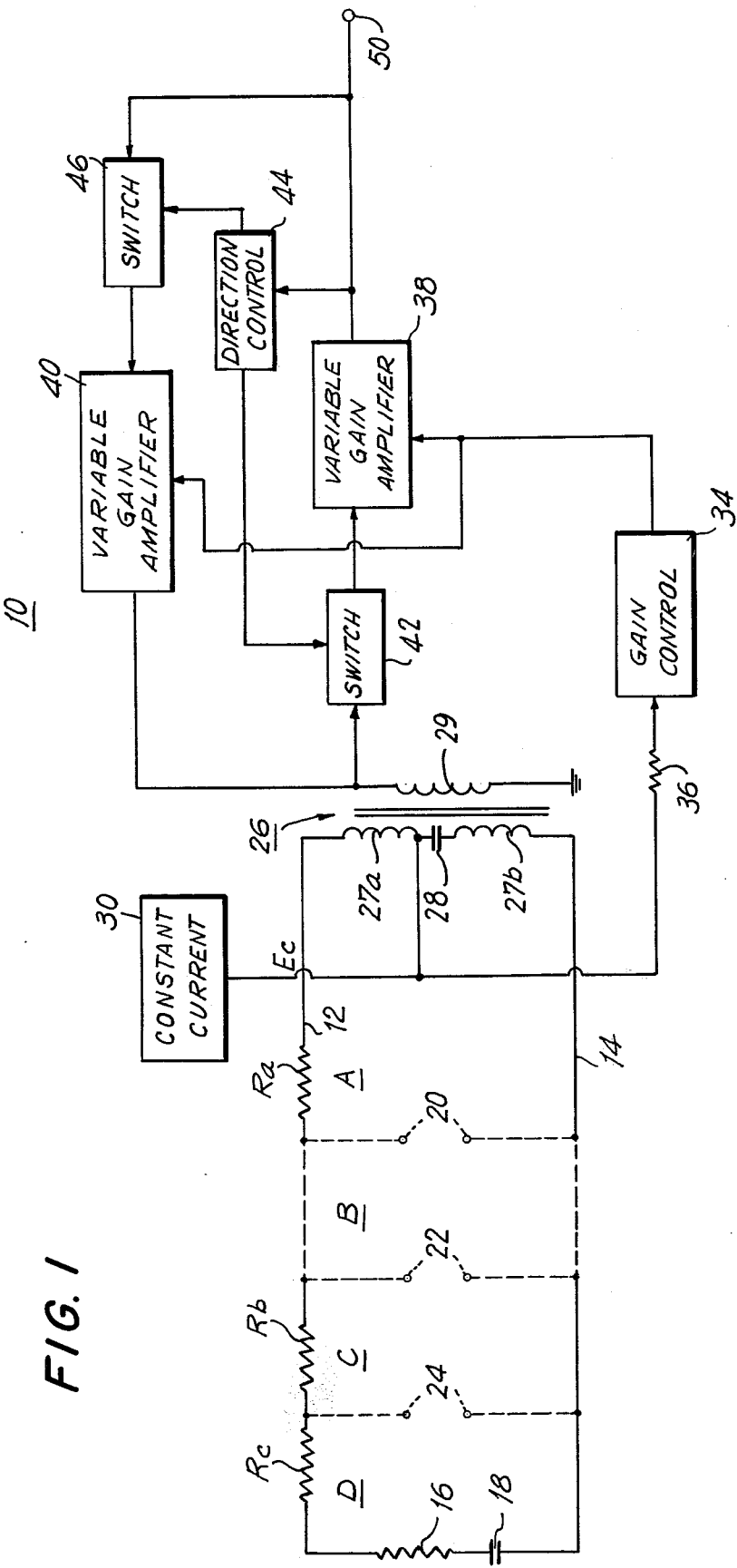
FIG. 1 is a partial schematic, partial block diagram of a typical application wherein the present invention can be used.

Referring now to the drawings, and in particular to FIG. 1, there is illustrated a partial schematic and partial block diagram of one typical application wherein the present invention may be used. It is recalled that typical communication systems for which the present invention finds ready application are pipe line communication links; remote telemetry links; and instrumentation and supervisory/control links. In each of these systems, the signals may be transmitted over conductors that are not of the highest quality. Moreover, no intermediate amplifying devices are provided between the communicating stations to assist in amplifying the signals. Furthermore, the distance between these stations is not fixed but may be variable and unpredictable.

For a proper understanding of the usefulness and advantages obtained by the present invention, the particular environment will be described in the context of a maintenance or supervisory and control line that normally accomapnies long distance multiplexed telephone lines. Typically, such long distance telephone lines include many conductor pairs that are formed into a single cable. In many instances, this cable is an underground cable. To assure that the intelligence information transmitted over these conductor pairs is of suitable quality, repeater stations are provided at predetermined locations along the cable. Although most of the conductor pairs are dedicated for subscriber service, or the like, at least one conductor pair is provided to permit communication between maintenance workers in the field and central office personnel. This conductor pair is known as the order wire line and, although physically passing through the repeater stations provided periodically along the length of cable, the order wire line is not operatively connected to any intermediate amplifying devices that are disposed at the repeater stations. This is because if amplification on the order wire line were provided, power would have to be derived from the primary supply for the main communication line and any faults in such derived power would deleteriously affect the main link. Thus, the order wire line is merely a long loop extending from, for example, the central office and exhibiting a resistive impedance that is a function of its length. In most embodiments of this order wire line, the line is terminated in a nonreflecting impedance.

The maintenance workers are provided with field telephone sets so that they may verbally communicate with central office personnel. These field sets are adapted to be connected, or plugged-in, to the order wire line at suitable locations along the length of line. Conventional connecting devices, such as jacks, are provided at spaced locations along the order wire line so that the field set, when connected thereto, effectively bridges the line at that location. For convenience, such connecting devices are usually provided at the repeater station locations. Of course, if desired, the field sets may be connected across the line at any arbitrary position. Hence, during normal maintenance work, a field set may be connected at any variably spaced location from the central office when the maintenance worker desires to communicate with central office personnel.

The foregoing description is depicted in FIG. 1 wherein a pair of electrical conductors 12, 14 is provided between a given location 10 and extends to a nonreflecting terminating impedance comprised of resistance 16 and a capacitor 18. The electrical conductors, which may be an order wire line, are provided with suitable tap points 20, 22 and 24. Of course, it is recognized that many additional tap points may be provided; but in the interest of simplification, only the illustrated tap points are described. Each pair of tap points divides the electrical conductors 12, 14 into sections A, B, C .... It may be appreciated that each conductor exhibits distributed resistance along the length thereof, the resistance being a function of the conductor length. Thus, in section A, the resistance of the conductors 12, 14 may be considered as a lumped resistor Ra. Similarly, the resistance of each additional section of conductors may be considered a lumped resistor that is a function of the section length, such as resistors R$b$, R$c$, .... Thus, the total resistance of the conductors 12, 14 is equal to Ra + Rb + Rc + ....

Typically, a telephone field set admits of low resistance. Accordingly, when compared to the resistance of a section of conductors, the resistance of the telephone field set is negligible. Consequently, when a telephone field set is connected to a pair of tap points, such connection effectively short circuits the conductors 12 and 14 such that the effective resistance of the conductors is now equal to the resistance of the sum of the conductor sections that extend between the telephone field set and the central office. For example, if a field set is connected to the tap point 20, the total resistance extending between the field set, which is a remote location, and the central office, which is a given location, is equal to the resistance of section A, and is thus equal to the resistance R$a$. Similarly, if the telephone field set is connected to the tap points 24, the total resistance between the remote location and the given location is equal to Ra + Rb. It is clearly recognized that the resistance of the electrical conductors which extends between the remote location and the given location is a direct function of the distance therebetween.

The conductors 12, 14, are transformer-coupled to the central office by coupling transformer 26. The transformer provides line isolation and transfer of signaling currents. The transformer is illustrated as comprising a pair of primary windings 27$a$ and 27$b$ that are connected in series by a capacitor 28. The transformer also includes a secondary winding 29. Although not illustrated therein, each of the windings may be provided with suitable taps, if desired. A series loop is thus formed of conductors 12, 14 and windings 27a, 27b and capacitor 28. The loop is closed by the connection of a telephone field set to a pair of tap points or by the terminating impedance comprised of resistance 16 and capacitor 18.

At the central office side of the transformer 26, the secondary winding 29 is coupled through a switch 42 to variable gain amplifier 38. The secondary winding is also connected through a variable gain amplifier 40. The other side of the secondary winding is connected to a reference potential, such as ground. A terminal 50 is connected to the output of the variable gain amplifier 38 and is also connected to an input of the variable gain amplifier 40 by a switch 46. Switches 42 and 46 are operated under the control of a direction control device 44.

The switches 42 and 46 are similar and each may comprise an electromechanical switch or a solid-state electronic switch, such as a switching transistor, or the like. These switches are selectively operable to the exclusion of the other. Thus, if switch 42 is operated, a transmission channel extends between the transformer 26 and the terminal 50 via the variable gain amplifier 38. When switch 42 is actuated, the switch 46 is disabled. Conversely, when the switch 46 is actuated, a transmission channel extends between the transformer 26 and the terminal 50 via the variable gain amplifier 40. It is thus recognized that the switches 42 and 46 are provided to form a half-duplex communication system between the central office 10 and a remote telephone field set. The direction control device 44 is connected to the terminal 50 and is operable to normally actuate the switch 42 and to de-actuate the switch 46. The terminal 50 is adapted to be connected to a suitable communicating device, such as a telephone set or the like. Hence, central office personnel can receive audio information from a remote location via the transformer 26, the normally actuated switch 42, the variable gain amplifier 38 and the terminal 50. If the central office personnel wishes to transmit information to the remote location, the presence of audio signals from the telephone set serves to energize the direction control device 44 such that the switch 42 is deactuated and the switch 46 is actuated. Hence, audio information may be transmitted from the tap 50 through the switch 46, through the variable gain amplifier 40 to the remote location via the transformer 26. The direction control device 44 is thus seen to be conventional and forms no part of the present invention. Hence, further description of this device is not provided.

The variable gain amplifiers 38 and 40 are similar and, of course, each is provided to permit the half-duplex mode of transmission with satisfactory amplification. That is, the variable gain amplifier 38 is adapted to variably amplify signals that are transmitted from the remote location whereas the amplifier 40 is adapted to variably amplify the signals that are transmitted to the remote location. The exact nature of the variable gain amplifier is described in detail in FIGS. 2A and 2B, below. Nevertheless, it is recalled that, in accordance with the present invention, the gain of the variable amplifier is adjusted in accordance with the distance between the central office 10 and the remote location. This gain control function is attained by the combination of the constant current source 30 and the gain control circuit 34.

The constant current source 30 is conventional and is adapted to supply a current of constant magnitude to the conductors 12, 14, notwithstanding the line impedance. The constant current source may be connected directly to one of the aforementioned taps provided on the primary windings 27$a$ and 27$b$ as shown, or alternatively, may be connected to the conductor 12. Preferably, the constant current source 30 supplies a constant magnitude D.C. current to the conductors. The gain control circuit 34 is coupled to one of the taps provided on the primary windings and, preferably, to the tap at the junction between the primary winding 27$a$ and the capacitor 28, by a resistor 36. The gain control circuit is connected to each of the variable gain amplifiers and is adapted to generate a gain control signal in response to an input voltage applied thereto. The gain control circuit may comprise an amplifier, an inverting circuit, a current generator or the like. This circuit is described in greater detail hereinbelow with respect to FIGS. 2A and 2B.

In operation, it is seen that the direct current supplied by the constant current source 30 does not flow through the conductors 12, 14 if a telephone field set is not connected to any of the tap points. In particular, the capacitor 18 impedes any direct current flow. However, once a field set is connected to a pair of tap points, the direct current flows from the constant current source 30 through the conductor 12 and through the connected field set to the conductor 14. If the field set is connected to the tap point 20, the direct current flows through the section A to develop a voltage potential across the conductors 12, 14 that is equal to the product of the direct current and the resistance Ra. Similarly, if the field set is connected to the tap point 24, the direct current flows through sections A, B and C, and through the connected field set to develop a voltage potential across the conductors 12, 14 that is equal to the product of the direct current and the sum of the resistances Ra + Rb. As noted above, the resistance of the telephone field set is negligible in comparison to the resistive impedance of the conductors so that the voltage drop across the connected field set has little effect on the total voltage drop across the conductors.

Since the direct current supplied by the constant current source 30 is of constant magnitude, the voltage Ec developed across the conductors 12, 14 is a direct function of the effective resistive impedance between the connected field set and the central office 10. The voltage Ec thus varies directly as the distance between the remote and given locations. This voltage is coupled to the gain control circuit 34 by the resistor 36 so that a gain control signal can be produced that is also a function of the distance between the remote and given locations. Consequently, the gain of each of the variable gain amplifiers 38 and 40 is determined by the separation between the communicating stations. Thus, if the field set is connected, for example, to the tap points 20 so as to be closer to the central office, the gain of the variable gain amplifiers is less than if the field set is connected to the tap points 24. This gain relationship is, of course, desired since less signal attenuation is present if the remote location is closer to the central office. Furthermore, since gain control is achieved as a function of cable resistance, temperature-dependent attenuation of signals is compensated.

When audio signals are transmitted from the remote location, they are coupled to the switch 42 by the transformer 26 and are then amplified by the variable gain amplifier 38 and communicated to the telephone set connected to the terminal 50. When audio signals are transmitted to the remote location, the direction control device 44 operates to actuate the switch 46 and de-actuate the switch 42 such that the audio signals which are transmitted from the terminal 50 are suitably amplified by the variable gain amplifier 40 and are coupled to the conductors 12, 14 by the transformer 26. The direct current supplied by the constant current source 30 provides excitation of the telephone field set that is bridged across the conductors. Accordingly, the telephone field set will be properly energized regardless of the particular location of the remote location. The transformer 26 effectively isolates this direct current and prevents that current from being superposed on the signals that are processed at the central office 10.

Figure 2A:
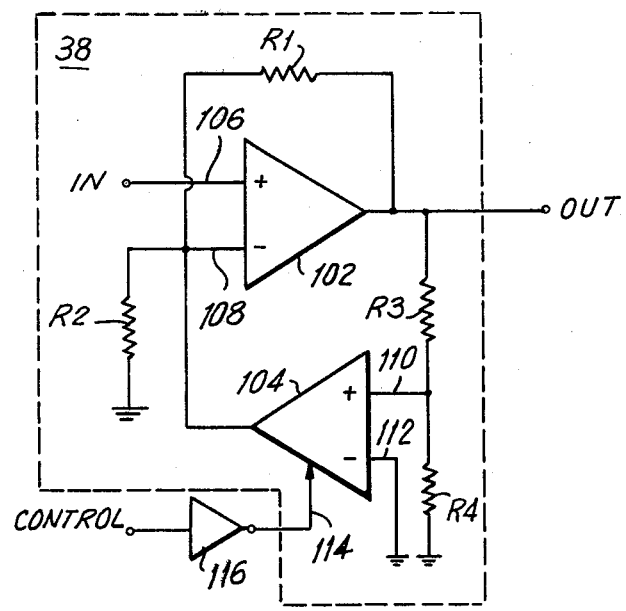
FIG. 2A is a schematic diagram of the variable gain amplifier in accordance with the present invention and FIG. 2B is a schematic representation that is useful in understanding the operation of the present invention.

A preferred construction of the variable gain amplifier is illustrated in FIG. 2A. As illustrated therein, the variable gain amplifier is comprised of an operational amplifier 102 having a noninverting input terminal 106 and an inverting input terminal 108. The operational amplifier 102 is conventional and is adapted to exhibit very high signal gain that can be adjusted in accordance with the particular feedback network used therewith. The particular configuration of the operational amplifier 102 is that of a noninverting amplifier having a feedback resistor R1 for interconnecting the output terminal with the inverting input terminal 108 and a further resistor R2 connected to the inverting input terminal. The resistor R2 is connected from the inverting input terminal 108 to a reference potential, such as ground. Hence, the noninverting input terminal 106 is designated the input terminal for receiving electrical signals to be amplified. It is thus appreciated that the noninverting input terminal 106 may be connected to the switch 42 or to the switch 46, as illustrated in FIG. 1.

The feedback network for the operational amplifier 102 includes a transconductance amplifier 104 that is connected in parallel with the feedback resistor R1. The gain of the transconductance amplifier is a function of a control current applied thereto. In particular, the transconductance $g_m$ of the amplifier 104 is a function of the control current supplied to the transconductance amplifier. Consequently, the output current of the transconductance amplifier varies proportionately with the control current applied thereto. A typical transconductance amplifier that finds ready application with the present invention is Model CA3080, manufactured by RCA.

The transconductance amplifier 104 is connected to the output of the amplifier 102 via a voltage divider network formed of the series connection of divider resistors R3 and R4. The junction defined by these divider resistors is connected to the noninverting input terminal 110 of the amplifier 104. The inverting input terminal 112 of the transconductance amplifier is connected to ground. As illustrated, the output of this amplifier is connected to the inverting input terminal 108 of the amplifier 102.

The control current supplied to the transconductance amplifier is a function of the effective resistive impedance between the remote location and the central office 10. Preferably, this function is linear. A control input 114 of the amplifier 104 is diagramatically represented as being connected to an inverting amplifier 116. The amplifier 116 is adapted to be supplied with the control voltage developed across the conductors 12, 14 and may thus be connected to the resistor 36 of FIG. 1. The inverting amplifier 116 is thus adapted to generate a control current that is linearly related to the voltage Ec, previously described. However, since the amplifier 116 is adapted to perform an inverting function, it may be appreciated that the magnitude of the control current decreases as the voltage Ec increases. This relationship is desirable because, as will be explained below, the gain of the amplifier 102 is inversely proportional to the transconductance $g_m$ of the amplifier 104. Consequently, as the voltage Ec increases, it is desirable to decrease the transconductance of the amplifier 104. Since the transconductance varies directly with the control current, the control current must likewise decrease as the voltage Ec increases.

The operation of the variable gain amplifier illustrated in FIG. 2A will now be described. The general expression for the gain of a feedback amplifier is:

$$A' = \frac{A}{1 - \beta A}$$

where A is the open loop gain of the amplifier 102 and $\beta$ is the feedback factor. In the illustrated circuit, $\beta$ is equal to the gain A'' of the transconductance amplifier 104 multiplied by the dividing ratio established by the resistors R3 and R4. With a normal passive resistor feedback network, the feedback factor $\beta$ cannot exceed unity. Consequently, if the transconductance amplifier 104 were replaced by solely passive resistors, the total gain A' of the amplifier 102 would never be less than unity. However, since the product of the gain A'' of the amplifier 104 and the divider ratio is capable of exceeding unity, the feedback factor $\beta$ for the illustrated variable gain amplifier can be greater than unity. Thus, depending upon the gain A'' of the amplifier 104, the illustrated variable gain amplifier can provide a net gain or attenuation in accordance with the magnitude of the control current applied to the control terminal 114. That is, the net gain or attenuation exhibited by the variable gain amplifier is a function of the control signal applied to the inverting amplifier 116 which, in turn, is a function of the effective resistive impedance between the conductors 12 and 14, the latter being determined by the distance between the remote location and the central office 10.

Figure 2B:
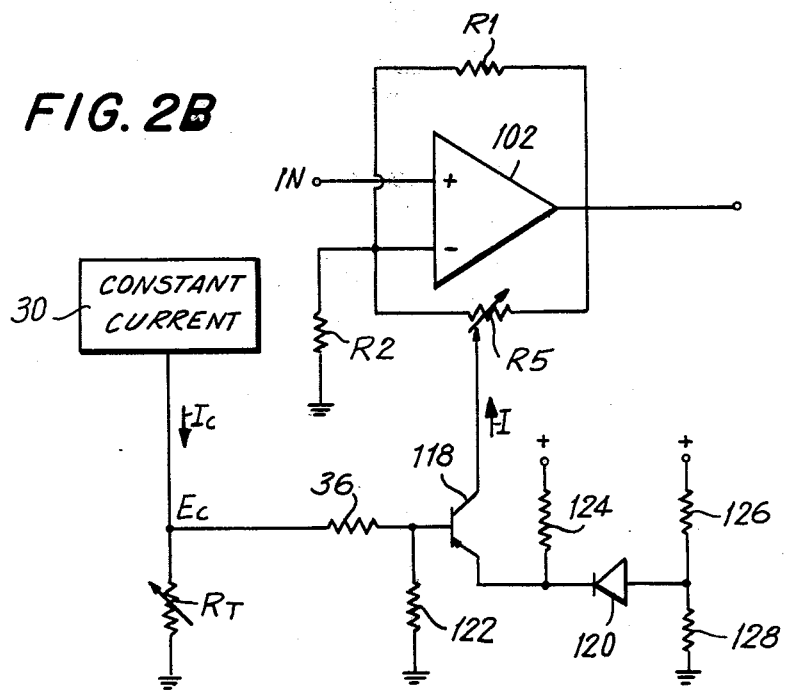

Since the output current of the transconductance amplifier 104 is proportional to the transconductance $g_m$, the amplifier 104 can be considered as a variable resistor in the feedback path of the amplifier 102. This characterization of the transconductance amplifier enables a simplified analysis of the operation of the variable gain amplifier depicted in FIG. 2A. A simplified schematic diagram, consistent with this analysis, is depicted in FIG. 2B. As there illustrated, the transconductance amplifier 104 is replaced by its equivalent variable resistor R5, and for further simplification, the voltage divider network formed by resistors R3 and R4 is omitted. The closed loop gain of the amplifier 102 may be expressed as:

$$A' = \frac{R1 R5}{R2(R1 + R5)}$$

If the resistance R1 is assumed to be much greater than the equivalent resistance R5, the expression for the gain of the amplifier may be simplified as:

$$A' = \frac{R5}{R2} \qquad (1)$$

Since the equivalent resistance R5 is inversely proportional to the transconductance $g_m$ of the amplifier 104, such that R5 equals $1/g_m$, equation (1), may be written as follows:

$$A' = \frac{1}{g_m R2} \qquad (2)$$

The transconductance $g_m$ of the transconductance amplifier 104 is directly related to the control current I applied to the control terminal 114. This direct relationship may be expressed as $g_m = I/K$. This control current I is supplied by the circuit schematically illustrated in FIG. 2B and will be described in detail hereinbelow. Equation (2) may now be rewritten as:

$$A' = \frac{K}{IR2} \qquad (3)$$

As will soon be described, the circuit schematically illustrated in FIG. 2B is adapted to generate the control current I which is more linearly related to the voltage Ec which is developed across the conductors 12, 14. It is recalled that the voltage Ec is proportional to the product of the constant current produced by the constant current source 30 and the effective resistance $R_T$ extending between the central office 10 and the remote field set location. Thus, $R_T$ varies directly as the distance between the remote location and the central office location. Since the control current I is linearly related to the voltage Ec to satisfy the expression $I = k/Ec$, and since the voltage Ec is equal to the product of the constant current Ic and the effective resistance $R_T$ to satisfy the equation $Ec = IcR_T$, then equation (3) may be rewritten as:

$$A' = \frac{KIcR_T}{kR2} \qquad (4)$$

Now, since K, k, Ic, and R2 are all constants, equation (4) may be written as follows:

$$A' = K' R_T \qquad (5)$$

It is thus appreciated that, in accordance with the present invention wherein the transconductance amplifier 104 is provided in the feedback circuit of the amplifier 102, the closed loop gain A' of the amplifier 102 varies directly as the effective resistance between the communicating locations. Since this effective resistance is a function of the distance between the locations, the gain A' of the amplifier 102 is controlled as a function of such distance.

The current generating circuit adapted to produce the control current I that is approximately linearly related to the voltage Ec in an inverse manner will now be described. As illustrated, the control current generator is supplied with the voltage Ec via the resistor 36. The current generator is comprised of a transistor 118 having its base electrode connected to the resistor 36 and its collector electrode connected to the control terminal of the transconductance amplifier 104 as schematically depicted in FIG. 2B. The transistor 118 is a pnp transistor having its emitter electrode connected to the linearizing diode 120. The anode of diode 120 is connected to a voltage divider network formed of the series connected resistors 126 and 128. The voltage divider network is provided with a suitable source of operating potential. A bias resistor 124 is connected to the junction defined by the emitter electrode of the transistor 118 and the cathode of the diode 120. This biasing resistor is also supplied with a suitable source of energizing potential. The transistor 118 is further biased by a biasing resistor 122 which is connected from the base electrode of the transistor to a reference potential, such as ground.

It may be appreciated that as the remote location is positioned at a greater distance from the central office 10, the effective resistance therebetween $R_T$ likewise increases to thereby increase the derived voltage Ec. A portion of this derived voltage is applied to the base electrode of the transistor 118 in accordance with the voltage divider ratio established by the resistors 36 and 122. The diode 120, together with the resistors 124, 126 and 128, supplies a positive bias potential to the emitter electrode of the transistor. As the voltage Ec increases, the bias potential across the base-emitter junction of the transistor decreases to thereby reduce the conductivity of the transistor. Consequently, the control current I that flows in the collector circuit thereof is reduced.

It may be appreciated that the presence of the diode 120 acts to linearize the relationship between the current I and the voltage Ec. More particularly, the diode and transistor tend to linearize the conductor-resistance/gain characteristic of the transconductance amplifier. If more diodes are used, this characteristic becomes more linear. In this manner, the equivalent resistance of the transconductance amplifier becomes linear with the effective conductor resistance $R_T$. However, extreme linearity is not essential to the proper operation of the present invention. Indeed, the single diode configuration, as illustrated, is satisfactory.

Although the present invention has been particularly described in the environment of a telephone system having an order wire line over which a maintenance worker may communicate with central office personnel, it is clearly recognized that the invention is not to be so limited. Applications such as pipeline communication links, remote telemetry links and instrumentation and supervisory links for the communication of data are envisaged. The remote locations provided in these communication links may be disposed at preselected tap points, such as depicted in FIG. 1 or at any arbitrary location along the electrical conductors.

With respect to the particular application to telephone maintenance communication as depicted in FIG. 1, various additional devices, not shown, are provided. For example, the terminal 50 may be transformer-coupled to the central office supervisory and control circuits as well as to a telephone set. Furthermore, a relay or dial pulse corrector may be connected to the primary windings of the transformer 26 so as to close associated contacts in response to signals transmitted from the remote location. These relay contacts, when closed, permit supervisory currents to flow through the appropriate central office circuits.

With respect to the variable gain amplifier as depicted in FIGS. 2A and 2B, the feedback resistors R1 and R2 for the amplifier 102 desirably limit the maximum gain of that amplifier when the transconductance amplifier 104 is not operated. Since the gain of the variable gain amplifier is dependent upon the feedback factor $\beta$ which, in turn, is a function of the gain of the transconductance amplifier, a net amplification or attenuation of signals is obtainable to thereby provide proper control over the signal levels regardless of whether the remote station is relatively close to or far from the central office.

Although the specific current generating circuit is illustrated and described with respect to FIG. 2B, it is appreciated that any other current generating circuit may be used, if desired. Alternatively, other control circuits may be used to generate a control signal for varying the transconductance $g_m$ of the transconductance amplifier in accordance with the effective conductor resistance extending between the remote location and the given location or in accordance with desired signal levels. Preferably, the equivalent resistance of the transconductance amplifier will be varied in a linear manner with the line resistance; but this linear relationship is not essential for the operation of the variable gain amplifier.

While the invention has been particularly shown and described with reference to an exemplary embodiment thereof, it will be obvious to those skilled in the art that the foregoing and various other changes and modifications in form and details may be made without departing from the spirit and scope of the invention. It is, therefore, intended that the appended claims be interpreted as including all such changes and modifications.

What is claimed is:

1. Apparatus for communicating electrical information signals between a given location and a remote location, the remote location being variably spaced from said given location and being connected thereto via electrical conductors such that the resistive impedance between said given and remote locations is a function of the distance therebetween, comprising an amplifier connected in series between said given location and said remote location for variably amplifying the electrical information signals communicated therebetween, said amplifier having a gain determinative feedback resistive element comprised of a transconductance amplifier having a transconductance $g_m$ that is a function of a current supplied thereto such that the feedback current of said amplifier varies proportionately with said supplied current; a source of constant current coupled to said electrical conductors for supplying a current of predetermined constant magnitude thereto; means for deriving a voltage that is a function of the product of said current and said resistive impedance between said given and remote locations; and a linearizing circuit responsive to said derived voltage for supplying said current to said transconductance amplifier such that said gain of said amplifier is linearly related to said resistive impedance between said given and remote locations, whereby said gain is increased as said distance is increased.

2. In a half-duplex communication system wherein electrical information signals are selectively transmitted over electrical conductors in a first or second direction between two spaced apart locations, and wherein said electrical conductors are not operatively connected to intermediate signal amplifying stations, and the effective resistance between said spaced apart locations is directly related to the distance therebetween, the improvement comprising first and second variable gain amplifying means disposed at one of said locations for variably amplifyng the selectively transmitted electrical information signals, each of said variable gain amplifying means comprising an amplifier and a transconductance amplifier connected in series feedback with respect to said amplifier, said transconductance amplifier having a variable gain that is a function of a control signal applied thereto, such that the output current of said transconductance amplifier is proportional to the transconductance thereof; control signal generating means including means for supplying a current of constant magnitude to said electrical conductors to thereby produce a voltage proportional to the product of said current and the effective resistance between said spaced apart locations; means for generating said control signal in response to said produced voltage, said means for generating said control signal comprising a current regulating transistor connected to a linearizing diode for supplying a control current to said transconductance amplifier such that the gain of said transconductance amplifier is more linearly proportional to said effective resistance; and first and second switch means connected in series with said first and second amplifiers, respectively, to selectively establish signal transmission paths in said first and second directions.

* * * * *